United States Patent [19]

Recker et al.

[11] Patent Number: 4,905,134
[45] Date of Patent: Feb. 27, 1990

[54] PARALLELING METHOD AND CONTROL FOR A VSCF SYSTEM

[75] Inventors: Bradley J. Recker, Rockford, Ill.; Christopher J. Rozman, Delavan, Wis.; Derrick I. Roe, Rockford, Ill.

[73] Assignee: Sundstrand Corporation, Rockford, Ill.

[21] Appl. No.: 291,501

[22] Filed: Dec. 29, 1988

[51] Int. Cl.[4] .......................... H02M 5/42; H02V 3/16
[52] U.S. Cl. ........................................ 363/98; 363/37; 363/164; 363/165; 307/64; 307/66
[58] Field of Search ...................... 363/71, 72, 95, 98, 363/164, 165; 307/43, 45, 52, 53, 58, 64, 66, 82, 78, 57; 318/314, 312

[56] References Cited

U.S. PATENT DOCUMENTS

| | | | |
|---|---|---|---|
| 4,510,399 | 4/1985 | Baker | 307/57 |
| 4,608,527 | 8/1986 | Glennon et al. | 318/314 X |
| 4,766,327 | 8/1988 | Fox | 363/95 X |

*Primary Examiner*—Patrick R. Salce
*Assistant Examiner*—Emanuel Todd Voeltz
*Attorney, Agent, or Firm*—Marshall, O'Toole, Gerstein, Murray & Bicknell

[57] ABSTRACT

Prior variable speed constant frequency (VSCF) system controls which operate the VSCF system while it is coupled in parallel with an external AC source across a load have controlled inverter output voltage based only upon the reactive current level supplied by the inverter. This has in turn resulted in the possibility of unstable system operation under load. In order to overcome the foregoing problem, a control for controlling the supply of power to a load from an inverter coupled in parallel with an AC power source across the load senses the real and reactive components of the current supplied by the inverter and the phase displacement of the power developed by the inverter relative to the power developed by the AC power source to derive an angular displacement signal. The frequency and phase of the inverter output are controlled in dependence upon the real current component supplied by the inverter and the angular displacement signal while the magnitude of the inverter output is controlled in dependence upon the real and reactive current components. The present control is capable of operating a VSCF inverter in a stable fashion under load.

11 Claims, 4 Drawing Sheets

PARALLELING METHOD AND CONTROL FOR A VSCF SYSTEM

TECHNICAL FIELD

The present invention relates generally to power system controls, and more particularly to a control which operates a variable speed constant frequency (VSCF) generating system coupled in parallel with a further source of AC power across a load.

BACKGROUND ART

Power sources of the VSCF type typically used in aircraft or aerospace applications comprise a synchronous generator which is coupled to the output of a variable speed prime mover, a rectifier/filter which converts the variable frequency output of the generator into DC power on a DC link, an inverter which converts the DC power on the DC link into constant frequency AC power and an optional filter which is coupled between the inverter and a load bus by controllable contactors. A further power source, for example another VSCF system, may be provided and may be connectable to the load bus by a second set of controllable contactors.

There are numerous applications where it is necessary or desirable to couple the VSCF system and the further power source in parallel across a load connected to the load bus. In such applications, it is important that no significant real and reactive power be transferred between the VSCF system and the AC power source so that losses are minimized and the load is shared equally between the system and the source.

A prior VSCF paralleling control disclosed in Baker et al. U.S. Pat. No. 4,728,806 operates switches in the inverter to control the flow of power between the VSCF system and the further power source. More specifically, real and reactive current demodulators develop real and reactive current error signals wherein the first represents the difference between the real currents supplied by the power sources and the second represents the difference between the reactive currents supplied by the power sources. The phase displacement of the VSCF output relative to the output of the external AC power source is controlled in accordance with the real current error signal. The output voltage of the VSCF system, however, is determined only in accordance with the reactive current error signal. It is believed that the use of only reactive current error to control inverter output voltage results in a system which can, under certain circumstances, become unstable under load.

In addition to the foregoing, the Baker et al. control does not accomplish individual phase regulation and regulates DC link voltage only by controlling generator exciter current. One consequence of this is that the parallel combination of power sources become "soft" due to the reduction in generator excitation when DC link voltage rises under no load conditions. Such a reduction in excitation causes the generator of the VSCF system to, in effect, disappear from the parallel combination so that it cannot supply significant power to a subsequently applied load until after a significant period of time has elapsed. This problem is said to be obviated in the Baker et al. control by sensing total real current error, i.e. the difference in real current flowing in all of the inverter phases, and using same to control inverter output phase displacement. Such a solution, however, does not directly address the underlying reason for the problem and is thus not an optimal solution.

SUMMARY OF THE INVENTION

In accordance with the present invention, a control for a VSCF power generating system is capable of operating the system in a stable fashion in parallel with an external AC power source.

More particularly, a control according to the present invention senses the real and reactive components of the current supplied by the inverter of the VSCF system and the phase or angular displacement of the power developed by the inverter relative to the power developed by the external AC power source to derive an angular displacement signal. The frequency and phase of the inverter output are controlled in dependence upon the real current component supplied by the inverter and the angular displacement signal. In addition, the magnitude of the inverter output is controlled in dependence upon the real and reactive current components supplied by the inverter. Thus, stability under load is improved.

In the preferred embodiment, once the magnitude of the inverter output has been determined, the excitation of the generator is controlled to in turn regulate DC link voltage relative to the voltage at a point of regulation (POR) so that output distortion is minimized. Significantly, the present control does not encounter the no load problem described above in connection with the Baker et al. patent during parallel operation since when DC link voltage attempts to rise under no load conditions inverter switching is controlled so that the POR voltage can be maintained at a regulated level.

The present VSCF system is capable of responding quickly to a step change in load and hence the problem of a "soft" power supply is avoided in a direct fashion.

The present control is simple in design, thus leading to improved reliability and effectiveness.

DESCRIPTION OF THE PREFERRED EMBODIMENT

Figure 1:
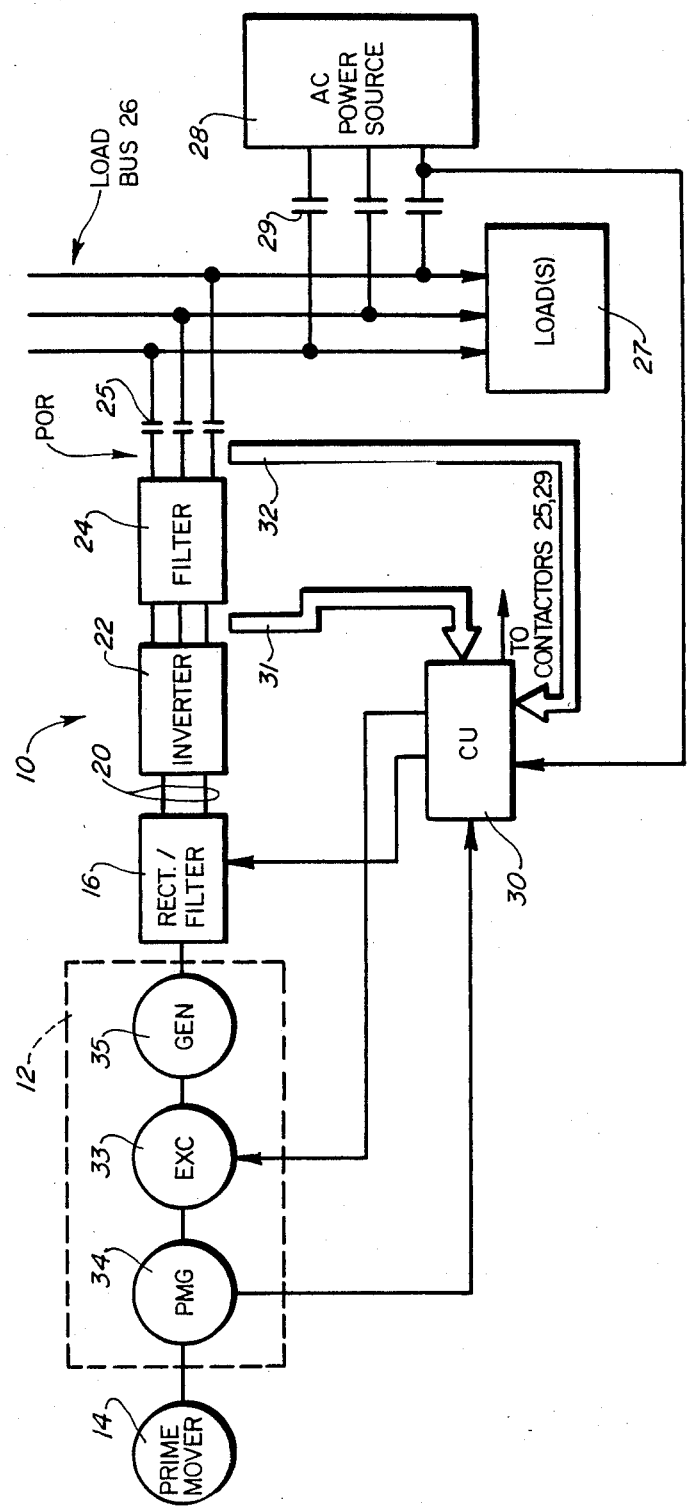
FIG. 1 is a block diagram of a VSCF system incorporating the control of the present invention in conjunction with an further AC power source and load bus.

Referring now to FIG. 1, a variable speed, constant frequency (VSCF) system 10 is illustrated. The VSCF system 10 includes a brushless, synchronous generator 12 driven by a variable speed prime mover 14 which may be, for example, an aircraft jet engine. The generator develops a polyphase, variable frequency AC output which is converted into DC power by a rectifier/filter 16. The resulting DC power is provided over a DC link 20 to a polyphase inverter 22 which converts the DC power into N phase constant frequency AC power. This AC power may be filtered by an optional filter 24 and is provided via a set of controllable contactors 25 to a load bus 26. The load bus 26 is, in turn, coupled to one or more loads 27. The load bus may also receive power developed by another AC power source which is coupled through a further set of controllable contactors 29 to the load bus 26. The AC power source may comprise an external AC source, an on-board AC source such as a further VSCF system, or the like. It should be noted that the arrangement of contactors shown in FIG. 1 is simplified for ease of understanding.

Figure 2:
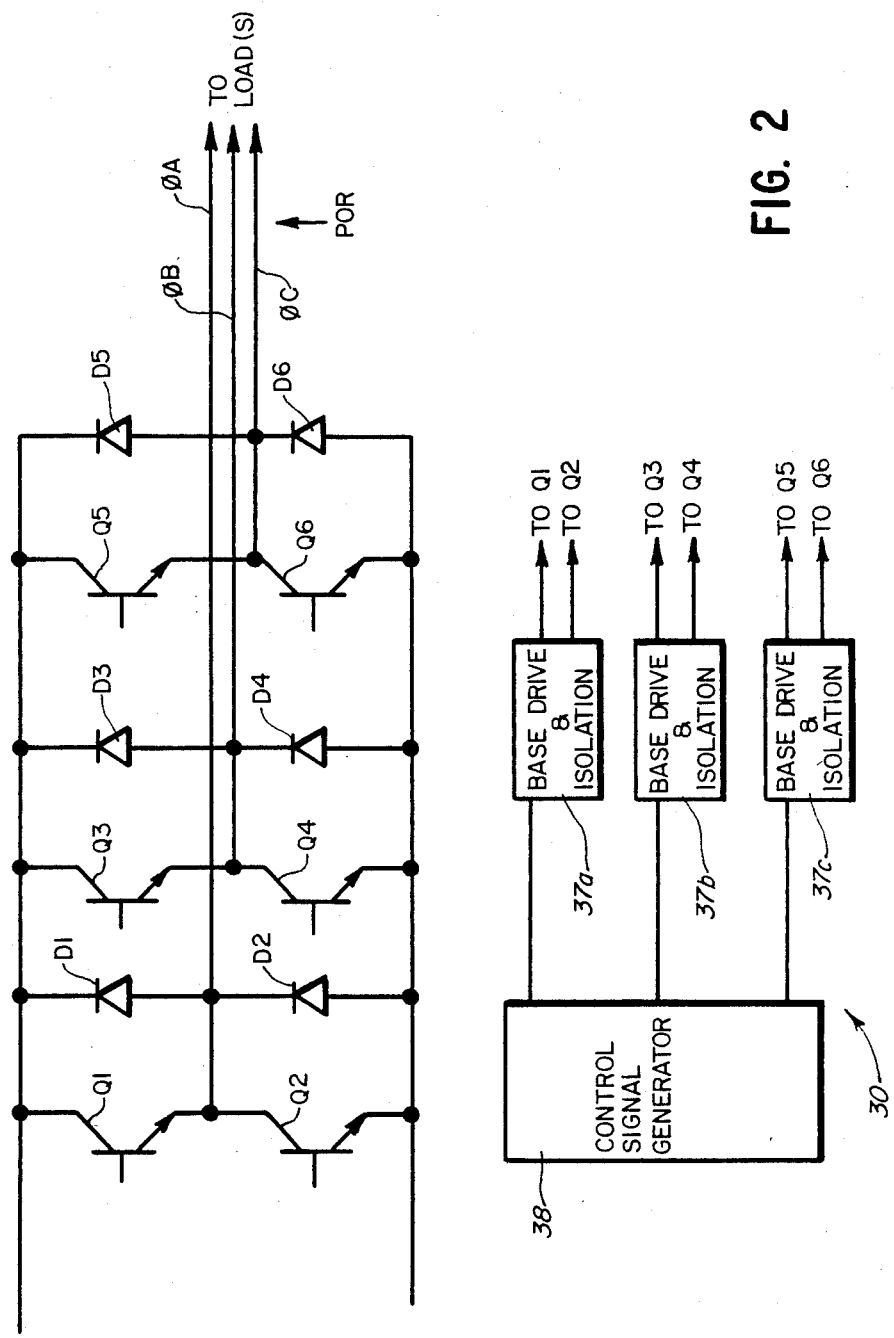
FIG. 2 is a combined schematic and block diagram of the CU in conjunction with a simplified representation of the inverter both as shown in FIG. 1.

The inverter 22 includes switches Q1–Q6, shown in FIG. 2, which are controlled by a control unit or CU 30. The CU 30 is responsive to output parameters of the inverter 22, as represented by the open arrow 31, as well as to output parameters at the POR, here shown as being at or near the contactors 25, as represented by the open arrow 32. The CU 30 further controls the current delivered to an exciter 33 of the generator 12. The generator 12 further includes a permanent magnet generator (PMG) 34 which supplies control power to the CU 30 and a main generator portion 35 which includes armature windings in which the generator power is developed.

The contactors 25 and 29 are controlled by the CU 30 to in turn couple the VSCF system 10 in parallel with the AC power source 28 across the load 27. The CU 30 is responsive to the power developed on one of the phases of the load bus 26, for example phase C and further develops a frequency reference signal as noted in greater detail hereinafter.

Referring specifically to FIG. 2, the switches Q1–Q6 of the inverter 22 are connected in a conventional three-phase bridge configuration together with associated flyback diodes D1–D6. The switches are controlled by base drive signals developed by base drive and isolation circuits 37a–37c. Each base drive and isolation circuit 37a–37c receives a control signal developed by a control signal generator 38 which is shown in greater detail in FIGS. 3 and 4.

Figure 3:
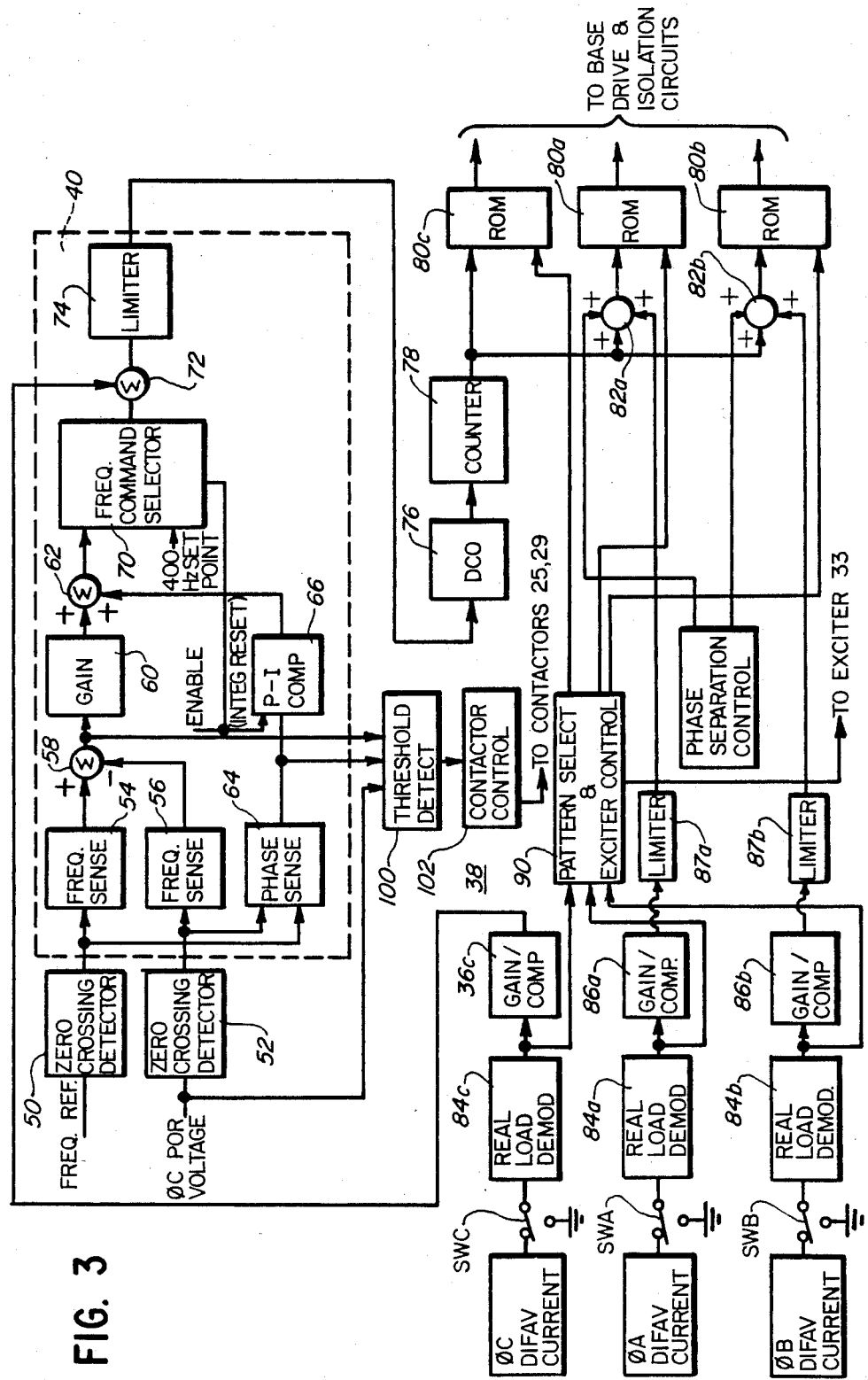
FIG. 3 is a block diagram of a portion of the control signal generator illustrated in block diagram form in FIG. 2 illustrating a portion of the control of the present invention.

Referring now to FIG. 3, the control signal generator may be implemented in whole or in part by software or hardware, as desired. The generator 38 includes circuitry 40 for controlling the phase and frequency of the inverter output so that the contactors 25 and 29 can be simultaneously closed to connect the VSCF system 10 and the AC power source 28 in parallel across the load 27 without generation of a significant transient in the power on the load bus 26. Such means comprises first and second zero crossing detectors 50, 52 which receive the frequency reference signal and the phase C voltage at the POR, respectively. The frequency reference signal may represent the voltage on a particular phase of the load bus, for example phase C, or may be another reference signal. The zero crossing detectors 50, include outputs which are coupled to inputs of frequency sensors 54, 56 having outputs which are in turn coupled to noninverting and inverting inputs, respectively, of a summer 58. The summer 58 develops a difference signal representing the difference in frequency of the reference signal and the voltage at the point of regulation. This difference signal is processed by a gain unit 60 and is provided to a first input of a further summer 62.

The signals developed by the zero crossing detectors 50, 52 are further provided to a phase sensor 64 which in turn develops an angular displacement signal representing the phase or angular displacement between the reference signal and the phase C voltage developed at the POR. This angular displacement signal is processed by a gain and compensation unit 66, which may be of the proportional-integral type, and the resulting integrated signal is provided to a second input of the further summer 62. The gain and compensation unit 66 is enabled by an enabling signal which in turn releases the internal integrator of the unit 66 upon issuance of a command to connect the VSCF system 10 in parallel with the AC power source 28.

The summer 62 is in turn coupled to a frequency command selector circuit 70 which passes either the output of the summer 62 or a frequency reference signal representing a desired 400 hz. output to a first input of a summer 72 in dependence upon the state of the enable signal. The summer 72 is coupled to a limiter 74 which in turn includes an output coupled to a digitally controlled oscillator (DCO) 76. The DCO 76 develops a clock signal at a frequency proportional to the magnitude of the output of the limiter 74.

The output of the DCO 76 is provided to a counter 78 that in turn develops low order addresses for address inputs of a reference phase memory 80c. Other reference phase memories 80a, 80b receive low order addresses developed by summers 82a, 82b, each having inputs coupled to the output of the counter 78. Each of the memories 80a–80c stores a plurality of pulse width modulated (PWM) inverter control waveforms for one of the inverter phases, although it should be realized that all of the control waveforms could instead be stored in a single memory, if desired. Each PWM waveform is stored as zeros (representing notches) and ones (representing pulses) in successive storage locations of the memories 80a–80c. The frequency at which the successive memory locations are addressed is determined by the frequency of the signal developed by the DCO 76. This accessing frequency in turn determines the phase and frequency of the signals produced by the memories 80a–80c, and thus the phase and frequency of the inverter output.

Each of the summers 82a, 82b receives phase reference signals developed by a phase separation control which is described in greater detail in Rozman et al., copending application Ser. No. 07/285,118, filed Dec. 16, 1988, and entitled "Phase Control for a VSCF System", the disclosure of which is hereby incorporated by reference. The reference signals cause the waveforms developed by the memories 80a, 80b to be displaced 120° and 240° relative to the waveform developed at the output of the memory 80c.

In addition to the foregoing signals, the summers 82a, 82b further receive signals developed by real load demodulators 84a, 84b, gain and compensation units 86a, 86b and limiters 87a, 87b. The real load demodulator 84a receives a signal DIFAV representing the deviation of the VSCF inverter 22 phase A output current magnitude from the average of the inverter 22 and power source 28 phase A current magnitudes. In like fashion, the demodulator 84b receives a signal representing the deviation of the inverter 22 phase B current magnitude from the average of the inverter 22 and power source 28 current magnitudes. The real load demodulators 84a, 84b develop signals representing the real component of the DIFAV signals. The outputs of the limiters 87a, 87b affect the phase displacements of the phase A and phase B inverter outputs relative to one another and to the reference phase C inverter output so that real current share between the VSCF system 10 and the external AC power source 28 is accurately controlled.

The signals developed by the real load demodulators 84a, 84b are provided to a pattern select and exciter control circuit 90. Also provided to the circuit 90 is a real component signal developed by a further real load demodulator 84c which receives a phase C DIFAV signal similar to the phase A and phase B DIFAV signals. The control circuit 90 in turn develops high order address inputs for the memories 80a–80c to in turn determine which PWM waveforms are retrieved therefrom. The control circuit also controls the current delivered to the exciter 33 in a fashion noted in greater detail hereafter in connection with FIG. 4.

Before the VSCF system 10 is connected in parallel with the power source 28, the outputs of same are not synchronized to one another. Also three switches SWA, SWB and SWC are in the position opposite to those shown in FIG. 3 so that the real load demodulators 84a–84c receive zero level signals. Upon issuance of a command signal resulting in generation of the enable signal coupled to the gain and compensation unit 66 and the frequency command selector 70, the frequency command selector 70 delivers the output of the summer 62 to the summer 72 and the limiter 74. The summer 72 includes a further input which receives a signal developed by a gain and compensation unit 86c coupled to the real load demodulator 84c. The summer 72 and the limiter 74 control the frequency of the output signal developed by the DCO 76 to in turn control the frequency at which successive memory locations in the memories 80a–80c are accessed. The phase angle and frequency of the inverter output are thus controlled in accordance with the real current component supplied by the inverter and the angular displacement signal to approach the phase and frequency of the power on the load bus 26 as provided by the AC power source 28. Once the phase, frequency and magnitude of the inverter output voltage at the POR are within predetermined ranges of the phase, frequency and magnitude of the voltage on the load bus 26, as determined by threshold detectors 100, a contractor control 102 develops a signal which causes closure of the contactors 25 or 29 (whichever was previously open) so that the VSCF system 10 is connected in parallel with the AC power source 28. Also, the switches SWA-SWC are moved to the positions shown in FIG. 3.

The control 40 for connecting the system 10 in parallel with the power source 28 is described in greater detail in Recker et al., copending application Ser. No. 07,300,280, filed Jan. 23, 1989, entitled "No Break Power Transfer Control for a VSCF Power Generating System", assigned to the assignee of the instant application and the disclosure of which is hereby incorporated by reference.

Figure 4:
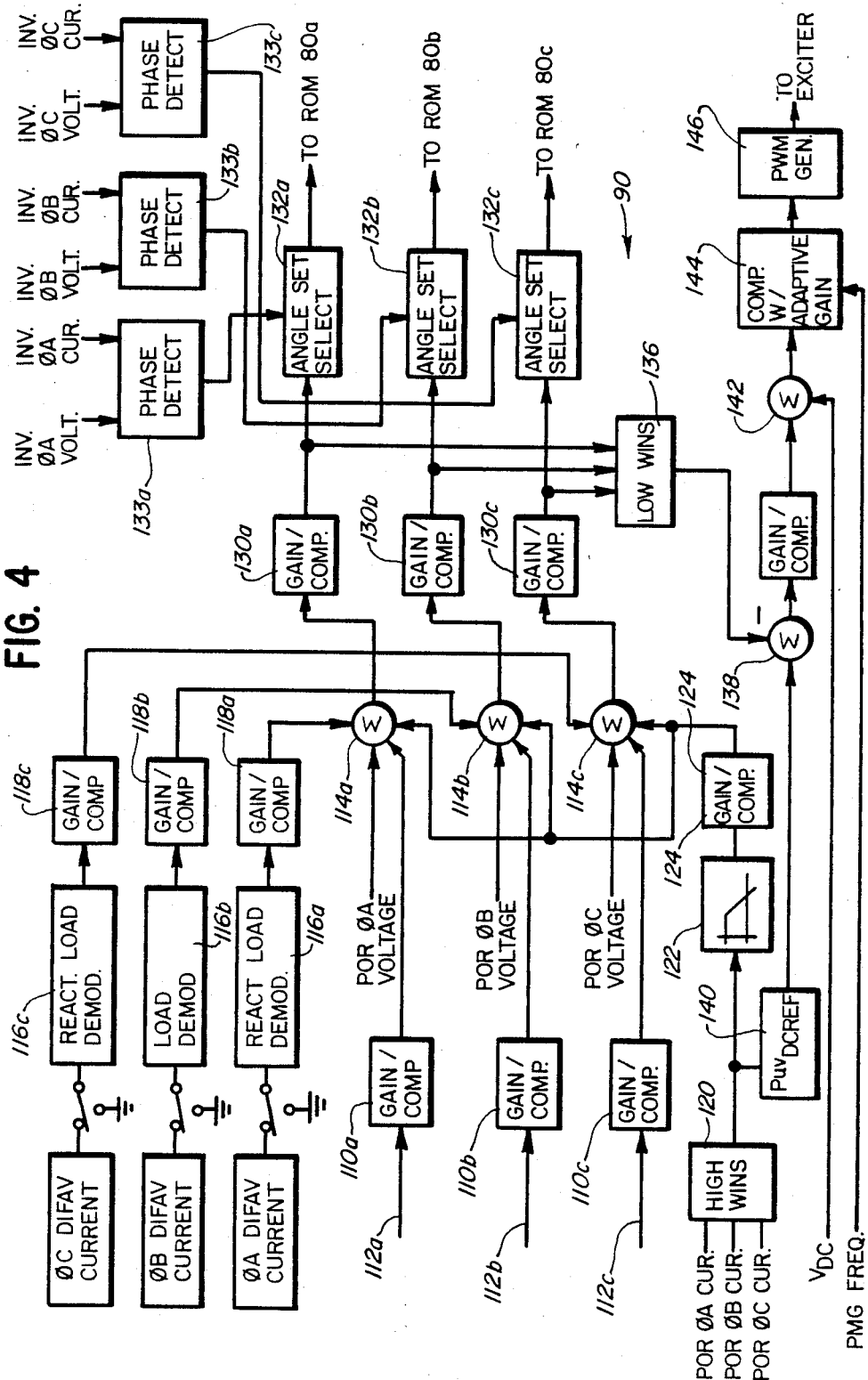
FIG. 4 is a block diagram of a further portion of the control of the present invention.

Referring now to FIG. 4, there is illustrated in greater detail the pattern select and exciter control circuit 90 shown in block diagram form in FIG. 3. The circuit 90 includes gain and compensation units 110a–110c which receive the signals developed on lines 112a–112c by the real load demodulators 84a–84c, FIG. 3. The outputs of the gain and compensation units 110a–110c are coupled to first inputs of three summers 114a–114c, respectively. Second inputs of the summers 114a–114c receive signals developed by reactive load demodu. ators 116a–116c and gain and compensation units 118a–118c, respectively. The reactive load demodulators 116a–116c in turn receive the phase A, phase B and phase C DIFAV signals.

A third input of each of the summers 114a–114c receives a signal representing the desired phase output voltage as developed by a high-wins circuit 120, an overcurrent characteristic circuit 122 and a gain and compensation unit 124. The circuits 120, 122 and 124 act to maintain the output phase voltages at a constant magnitude until the highest phase current reaches a predetermined magnitude. If the highest phase current continues to increase beyond the predetermined magnitude, the desired phase output voltages are linearly decreased so that current limiting is provided.

The outputs of the summers 114a–114c are error signals representing the deviation of the POR phase voltage from the desired phase output voltage magnitudes of the inverter 22. These signals are coupled by gain and compensation units 130a–130c to angle set selection circuits 132a–132c, respectively. Each of the angle set selection circuits 132a–132c also receives a signal developed by an associated phase detector 133a–133c, respectively. The phase detectors 133a–133c develop signals representing the power factor of the inverter phases. The circuits 132a–132c develop the high order addresses for the memories 80a–80c based upon the inverter power factor to in turn select particular PWM waveforms from the memories so that distortion in the output of the inverter is minimized.

The outputs of the gain and compensation units are also provided to a low wins logic circuit 136 which passes the signal having the least magnitude from the outputs of the gain and compensation units 130a–130c to an inverting input of a summer 138. The summer 138 includes a noninverting input which receives a reference signal, designated $PUV_{DCREF}$, developed by a reference signal generator 140. The reference signal generator 140 is responsive to the magnitude of the highest phase current of the inverter as provided by the high wins circuit 120. The signal $PUV_{DCREF}$ represents the desired ratio of DC link voltage to inverter fundamental output voltage. The summer 138 develops a difference signal which is processed by a gain and compensation unit and provided as a reference signal to a further summer 142 which subtracts therefrom a signal representing the DC link voltage $V_{DC}$. The resulting error signal is provided to a compensation unit having an adaptive gain which is varied in accordance with the speed of the generator, as detected by the output frequency of the power developed by the PMG 34, to maintain a constant closed loop gain. This signal is then applied to a PWM generator 146 which in turn develops pulse width modulated power which is delivered to the exciter 33.

As is evident from the foregoing discussion, the magnitude of the inverter output is determined not only in accordance with the reactive currents supplied by the inverter, but also by the real currents. This results in a control which is more stable under load as compared with prior art controls, including that disclosed in the above-identified Baker et al. patent.

In addition to the foregoing, under conditions of low or no load the inverter switches are controlled to regulate POR voltage rather than regulating POR voltage solely by means of controlling generator excitation. Thus, sufficient generator excitation is available, even under no or low load conditions, so that szep loads can be supplied power without significant delays.

We claim:

1. A method of controlling the supply of power to a load from an inverter coupled in parallel with an AC power source across the load, comprising the steps of:
   sensing the real and reactive components of the currents supplied by the inverter;

sensing the phase displacement of the power developed by the inverter relative to the power developed by the AC power source to derive an angular displacement signal;

controlling the phase angle of the inverter output in dependence upon the real current component supplied by the inverter and the angular displacement signal; and controlling the magnitude of the inverter output in dependence upon the real and reactive current components supplied by the inverter.

2. The method of clair 1, wherein the step of controlling the magnitude includes the step of selecting inverter control waveforms from a memory.

3. The method of claim 2, wherein each control waveform is stored in successive memory locations as a series of zeroes and ones representing notches and pulses, respectively, in the inverter output and wherein the step of controlling the phase angle includes the step of addressing successive memory locations at a speed dependent upon the real current component.

4. The method of claim 2, wherein the step of controlling the magnitude further includes the steps of summing signals derived from the real and reactive current components supplied by the inverter and using the summed signals to select the control waveforms.

5. The method of claim 2, wherein the step of controlling the magnitude further includes the steps of summing signals derived from the real and reactive current components supplied by the inverter with signals representing the voltage at a point of regulation (POR) and using the summed signals to select the control waveforms.

6. The method of claim 4, wherein the inverter is provided power by a brushless generator having an exciter which provides excitation to a main generator portion and including the further step of controlling the excitation provided by the exciter in accordance with the summed signals.

7. A control for controlling the supply of power to a load from a variable speed, constant frequency (VSCF) system having a polyphase inverter coupled in parallel with a polyphase AC power source wherein the VSCF system and the AC power source provide phase voltages and phase currents to the load, comprising:

means for developing real and reactive difference signals representing the deviation of the real and reactive components of the phase currents supplied by the inverter from the average of the real and reactive phase currents supplied by the inverter and the power source;

means for sensing the angular displacement between corresponding phase voltages of the inverter and the AC power source to derive an angular displacement signal;

first means coupled to the sensing means for controlling the angular displacements of the inverter phase voltages in dependence upon the real difference signal and the angular displacement signal; and second means coupled to the first sensing means for controlling the magnitude of the inverter phase voltages in dependence upon the real and reactive difference signals.

8. The control of claim 7, wherein the second controlling means includes a summer coupled to the developing means which sums the real and reactive difference signals with a signal representing a voltage developed at a point of regulation to derive a selection signal.

9. The control of claim 8, wherein the second controlling means further includes a memory which stores pulse width modulated (PWM) inverter control waveforms and a waveform selecting circuit coupled between the summer and the memory which selects particular waveforms from the memory in dependence upon the selection signal.

10. The control of claim 9, wherein each PWM control waveform is stored in successive memory locations as a series of zeroes and ones representing notches and pulses, respectively, in the inverter output and wherein the first controlling means includes means for addressing successive memory locations at a frequency dependent upon the real difference signal.

11. The method of claim 8, wherein the inverter is provided power by a brushless generator having an exciter which provides excitation to a main generator portion and further including means for controlling the excitation provided by the exciter in accordance with the selection signal.

* * * * *